Oct. 1, 1963  E. H. JACOBSEN  3,105,966
DOPPLER RADAR SYSTEM
Filed Jan. 4, 1960  2 Sheets-Sheet 1
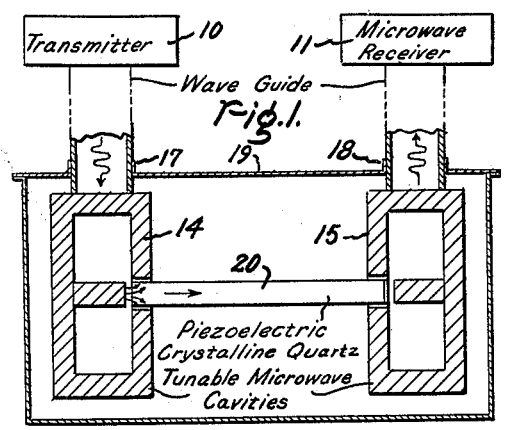
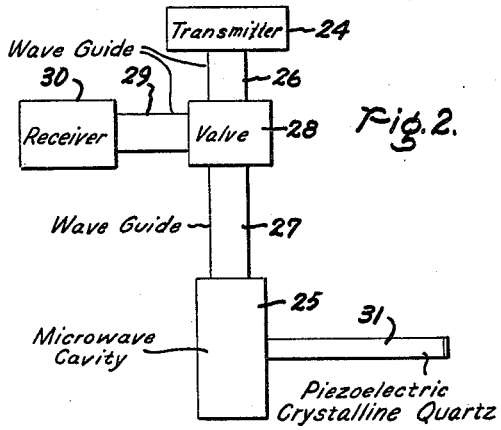
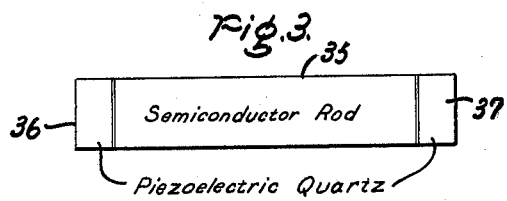
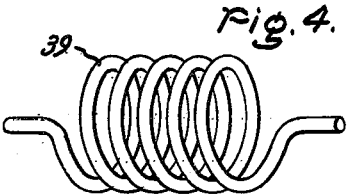
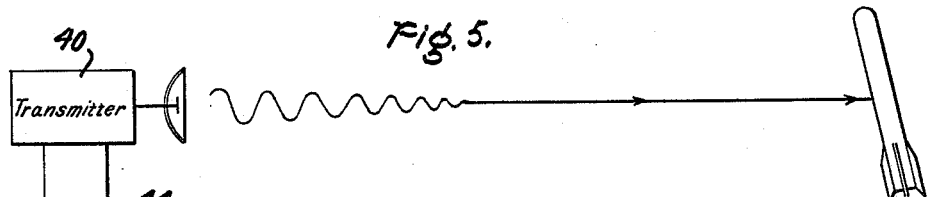
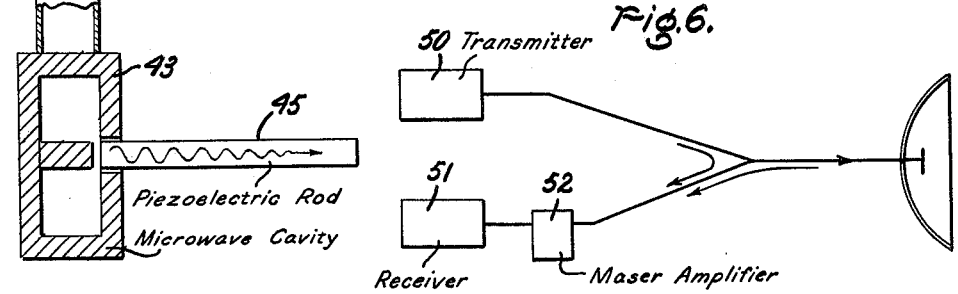
Inventor:
Edward H. Jacobsen,
by Charles J. Wirth
His Attorney.

Oct. 1, 1963 E. H. JACOBSEN 3,105,966
DOPPLER RADAR SYSTEM
Filed Jan. 4, 1960 2 Sheets-Sheet 2
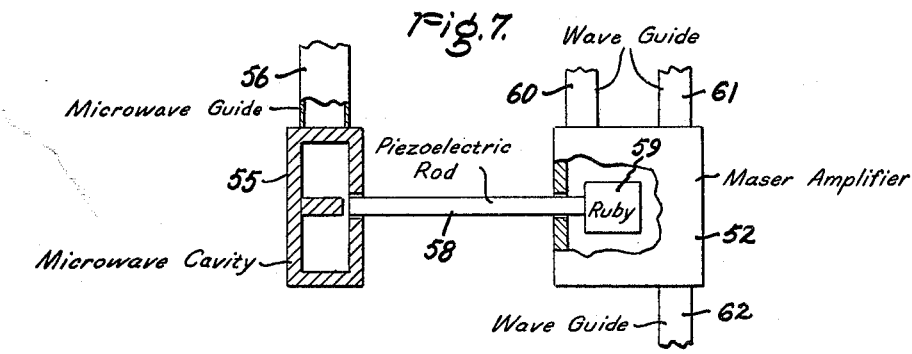
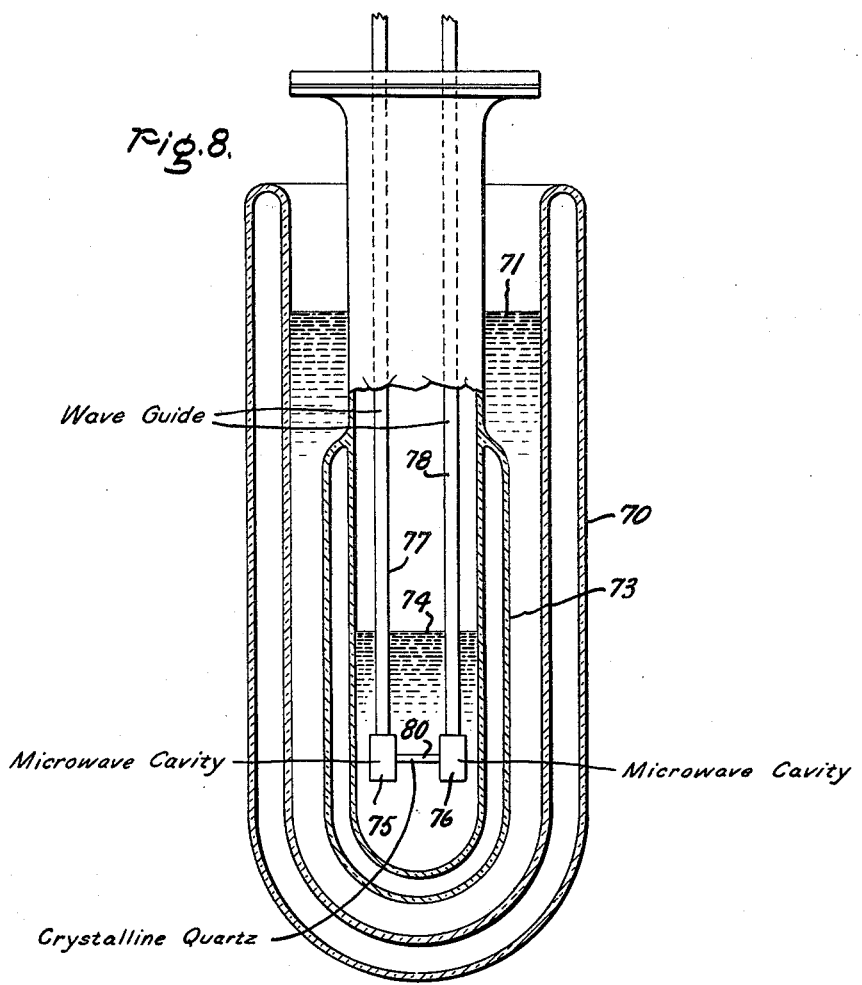
Inventor:
Edward H. Jacobsen,
by his Attorney.

United States Patent Office 3,105,966
Patented Oct. 1, 1963

3,105,966
DOPPLER RADAR SYSTEM
Edward H. Jacobsen, Schenectady, N.Y., assignor to General Electric Company, a corporation of New York
Filed Jan. 4, 1960, Ser. No. 99
2 Claims. (Cl. 343—8)

The present invention relates generally to the art of signal transmission and is more particularly concerned with a novel method of transmitting microwave signals of X-band and higher frequencies and with new apparatus implementing this method.

It has long been recognized by those skilled in the art that the successful generation and propagation of ultrasonic vibrations would hold important scientific and commercial possibilities. Efforts accordingly were made toward the realization of this objective and prior to the present invention, others succeeded in producing sound waves of frequencies up to one-kilomegacycle. On the basis of what was observed and learned in the course of these events, however, it was concluded by the experts that the maximum had been reached and that any effort to go into substantially higher frequency ranges could not succeed because of the inherent physical limitations of materials. In other words, those most highly skilled and knowledgeable in this special field concluded from their experimental results and analyses that they had closely approached, if not actually reached, the theoretical upper limit of sound wave frequency. On this basis, their further work with high frequency sound waves was limited exclusively to frequencies well below the X-band which is preferred as the operating range of radar systems.

In contrast to the stage of development of the prior art at the time when I made my surprising discovery subsequently to be described, it is now possible by virtue of the present invention predicated upon this discovery to transmit microwave signals through use of sound waves of ultrahigh-frequencies. Thus, I have successfully produced sound waves of frequencies which are orders of magnitude greater than the maximum produced prior to my present discovery and invention. Further, I have succeeded in causing these unique sound waves or phonons to produce microwave signals of corresponding frequencies so that the phonons may constitute an integral part of the total transmission.

Through a departure from the prior art in respect to the construction and nature of the transducer component of my novel apparatus, microwave-phonon-microwave transmissions can be very substantially improved. In addition, I have discovered that under certain conditions, phonons can be caused in accordance with my invention to echo or reflect so that signal delay can be multiplied for a given piezoelectric element and so that one portion of this element may perform both input and output transducer functions. I have further found that while an element consisting of a Z-cut of quartz crystal rod (i.e., rod axis parallel to the crystallographic axis of quartz), cannot be used as a transducer to produce the present new results, it can be modified, according to this invention, so that it will serve effectively as a transducer and these new phonons will propagate in it. The modification consists essentially in fastening a portion of an X-cut or a Y-cut quartz crystal to one end of the Z-cut rod because I have found that these new ultrahigh-frequency phonons once produced will propagate across the boundary or interface between the two crystal elements and will propagate in the Z-cut rod regardless of any disparity in the longitudinal dimensions of the crystal elements. On the basis of this discovery, I have envisioned the possibility of incorporating semiconductor elements in place of Z-cut of quartz crystal rods in the apparatus of this invention and now have confirmed the feasibility of doing this.

Because ultrahigh-frequency microwave signals are of very substantial utility, the present invention constitutes an important step forward in the art. The prior art failed to break through the one-kilomegacycle barrier and, consequently, never advanced to the point of utility but came to rest where no more than scientific interest was in prospect. The one-kilomegacycle signal is far too limited in its capacity to store information to be of any practical value for use as a transducer component in a computer. Further, such a signal is not useful for operational radar and similar purposes.

I have envisioned uses of the present invention which may be made to great advantage. In particular, I have conceived the possibility of incorporating this invention in a Doppler radar system to substantially increase the accuracy and utility of that system. In this embodiment, the invention performs the function of a delay line and thus serves to store the original signal for later readout and comparison with a component of this signal returning from the object being ranged.

Another application of this invention making use of this delay line feature would have the objective of jamming radar through the means of phantom signals. The system, accordingly, would include a radar receiver, a transmitter and a delay line embodying this invention. A radar signal detected by the receiver would be stored in the novel delay line and subsequently read out and transmitted back to the original signal source at predetermined intervals.

In still another embodiment of this invention, I have conceived the incorporation of the present apparatus in a radar system to maintain the maser amplifier thereof in operating condition throughout the transmission period. In this instance, the ability of the novel apparatus of my present invention to transmit ultrahigh-frequency microwave energy via phonons is utilized to pump the maser cavity from a delay line with a drive signal which will desaturate the maser promptly following initial saturation by the original radar signal.

Those skilled in the art will understand that the present invention is useful also in high speed computers as a delay line because of its high storage capacity and because its stored signal access time is about $10^{-9}$ second.

In its method aspects, this invention broadly described, comprises the steps of directing microwave signals of nine-kilomegacycles or higher frequency against one end of a quartz rod and thereby producing phonon signals in the rod. This method further comprises the step of receiving microwave signals subsequently produced at the other end of the quartz rod through conversion of phonon signals into microwave signals of corresponding frequency. Thus, as indicated above, this is a new method of transmitting signals of X-band microwave frequency and higher constituting as a minium approximately an order of magnitude greater frequency than any such electromagnetic energy signals heretofore transmitted through the production, propagation and conversion of phonon signals. Similarly, it is unique as a method of producing sound of a pitch far greater than anything hitherto produced in any manner or, in fact, believed by those skilled in the art to be producible by any means in any medium.

More specifically, this method in one form may involve production of phonons at one end of the rod and the production of microwave energy through conversion or transducing action at one or the other end of the rod, according to the number of times the phonon signal is reflected and permitted to travel the length of the rod before readout. As an alternative, by providing a suitable barrier to the propagation of the phonons at one end of the rod, the phonon signals may be prevented from being coherently reflected so that one end of the rod serves the input transducing function while the other performs the output transducing function. In either instance, the method may be operated intermittently so far as the microwave input signal is concerned so that there is time for the signal to be stored and then read out before the next microwave signal input to the system. An advantage of operating in this manner is that a highly sensitive receiver may be incorporated in the system to detect the relatively weak regenerated microwave signals but will be protected from the strong microwave input signals.

Referring to the drawings accompanying and forming a part of this specification:

FIGURE 1 is a somewhat diagrammatic view of a system incorporating this invention and including two opposed microwave cavities shown in vertical section;

FIGURE 2 is a view similar to FIGURE 1 of a system embodying this invention in another form wherein the phonon signal is reflected and transmitted to a sensitive receiver protected from the strong microwave signal source;

FIGURE 3 is a side view of a quartz crystal rod illustrating propagation of phenon waves within this body;

FIGURE 4 is a view like FIGURE 3 of a rod-like body disposed in coil form composed of a semiconductor and a comparatively short piezoelectric crystal;

FIGURE 5 is a diagrammatic view of a Doppler radar system including apparatus of this invention and illustrating the principle of its operation as described above;

FIGURE 6 is a schematic view of a radar system including transmitter, antenna, maser amplifier and receiver;

FIGURE 7 is a diagrammatic view of the maser amplifier component of FIGURE 6 showing the apparatus of the present invention in operating relation to the maser amplifier unit; and FIGURE 8 is an elevational view, partly in section, of apparatus embodying the present invention.

Broadly described, the novel apparatus of this invention comprises a microwave signal source which is capable of producing signals of X-band or higher frequency, a transformer means including a tunable microwave cavity to receive microwave signals from the source and concentrate and direct those signals and a piezoelectric rod-like body having one end portion disposed in the microwave cavity of the transformer and having its other end portion directed away from the transformer and disposed outside that cavity and a receiver arranged to receive microwave signals regenerated by the piezoelectric body.

In a preferred embodiment of this invention, this apparatus will incorporate as the piezoelectric body a quartz crystalline rod which is provided at its end remote from the microwave cavity with a coating of indium effective to scatter and dissipate ultrasonic waves or phonons traveling through the rod and thus prevent coherent reflection of the signal. In this system, the end portion of the rod within the microwave cavity serves as a transducer for the input microwave signal to the rod and the indium-coated end serves as the transducer for phonon signals. The indium coating, accordingly, constitutes a terminal in this kind of delay-line component of a microwave signal transmission system.

In another preferred embodiment of this invention, the piezoelectric body will be of rod-like form and the ends of it will be disposed parallel to each other and in planes at right angles to the longitudinal axis of the rod. Advantageously, the rod may be a composite of piezoelectric and non-piezoelectric material with a suitable adhesive therebetween which will be effective to conduct, transmit or propagate phonon microwave signals from the piezoelectric material to the non-piezoelectric material or vice versa. Also, as indicated in the drawings in some instances where a protracted delay is desirable, the rod-like phonon-propagating body may be made in the form of a coil and, here again, the body may be a composite of piezoelectric and non-piezoelectric materials, but the ends of it will be disposed in planes at right angles to the longitudinal center line of the rod in the end portions in the interest of maximum phonon signal strength as will subsequently be more fully described. Still another desirable application of the present invention is its incorporation in a radar system including the maser amplifier in operative relation to a receiver. In this instance, as illustrated in FIGURES 6 and 7, the maser cavity is pumped with a microwave signal to maintain the maser constantly in operational condition through the means of a phonon-propagating and transducing quartz crystalline body or the like. In this system, phonons are produced in the piezoelectric body by means including a microwave cavity.

I have further envisioned, on the basis of my surprising discoveries, the use of a body of electrostrictive (i.e., ferroelectric) material in place of the piezoelectric body of the novel combination described above. The advantage would be that frequency doubling would result. Lead metaniobate would be satisfactory as the ferroelectric for this purpose because it does not go through a phase change when its temperature is reduced to that of liquid hydrogen. Unlike the semiconductors used in this invention, the ferroelectric bodies need not be composites, but will function as integral bodies to produce the new desired results. It is important, as in the case of the piezoelectric bodies, that the end faces of the ferroelectric bodies be "square-cut" in order to minimize the tendency toward attenuation of the high frequency signal.

More in detail referring specifically to the drawings, the apparatus of FIGURE 1 comprises a source or transmitter 10 capable of producing microwaves of X-band frequency or higher, a microwave receiver 11 and transformer means for converting microwave signals into phonon signals of the same frequency and for regenerating the microwave signal. The transformer means in this system includes tunable microwave cavities 14 and 15 suitably of conventional design and construction as known to those skilled in the art. Cavity 14 is connected to transmitter 10 by a waveguide 17 while cavity 15 communicates with receiver 11 through a waveguide 18 likewise of a suitable design. The microwave cavities 14 and 15 are disposed with their side openings in register and a rod-like body 20 of crystalline quartz is disposed with one of its ends within the side opening of microwave cavity 14 and the other of its ends in its corresponding opening of microwave cavity 15. Rod 20, accordingly, is located in such a manner that microwaves may be tuned and focused in cavity 14 and directed against the end of rod 20 therein to produce phonon signals within the rod. Likewise, the other end of rod 20 is situated so that through transducing action of rod 20 in this region microwave signals are produced from the phonon signals and directed to and through waveguide 18 to receiver 11. Rod 20 at its end within cavity 15 is provided with a coating of indium of thickness sufficient that the phonons are scattered and dissipated and are not reflected back toward microwave cavity 14 in any coherent manner. This indium coating will suitably be at least 0.0001 inch in thickness, but it will not be so heavy as to materially adversely affect the transducing action of rod 20 and the generation of microwave signals within cavity 15.

In the system illustrated in FIGURE 2, an X-band microwave frequency, transmitter 24 is arranged to direct microwave signals toward microwave cavity 25, again suitably of conventional or standard design, waveguides 26 and 27 serving with valve 28 to connect receiver 30 and microwave cavity 25. A receiver 30 also communicates with microwave cavity 25 through valve 28 and waveguide 27. The assembly is completed with a quartz crystalline rod 31 of piezoelectric characteristic which is related to microwave cavity 25 in the manner described above with reference to FIGURE 1 and microwave cavity 14 and rod 20. In this instance, however, the rod is not provided at its remote end with a coating of indium or equivalent material because of the desirability of having the ultrasonic vibrations or phonons reflected from the remote end back to the microwave cavity for regeneration of the microwave signal.

In the operation of the FIGURE 2 system, receiver 30, which is highly sensitive and therefore requires protection against direct high-amplitude signals directly from source 24, automatic valve 28 serves to close the receiver against communication with the waveguide 27 during periods when microwave signals are traveling from transmitter 24 to cavity 25. Between these two emission periods, valve 28 connects the receiver and waveguide 29 to cavity 25 so that microwave signals generated by transducing action of rod 31 can be detected or read out by receiver 30.

In FIGURE 3, a composite rod constituting a delay-line component in accordance with this invention is illustrated as comprising a rod 35 of suitable semiconductor material, such as a portion of a silicon crystal and two end caps of piezoelectric quartz 36 and 37. Caps 36 and 37 are of the same cross-sectional size and shape as rod 35 and are secured to the rod by an adhesive material which does not materially impair phonon-propagation throughout the length of the composite body. I found ordinary stop-cock grease to be an effective adhesive because of its ability to perform both the adhesive and phono-propagating functions at normal operating temperatures (below 80° K.) of the cryogenic devices of this invention.

The element illustrated in FIGURE 4 is functionally the same as rods 20 and 31 and composite rod 35. It differs from those others, however, in its physical form, being of somewhat reduced cross-section and being a coil rather than a cylindrical article. As illustrated, it is not a composite body although it is contemplated that this may be made after the manner of the article of FIGURE 3. As in the case of all the others, however, it has end faces which are disposed in planes extending perpendicularly to the longitudinal end portions in each case. The primary advantage in this coil form of delay-line component is the protracted delay period which it affords due to the longer time required for phonon signals to traverse the body. I have found, surprisingly, that the tendency toward attenuation of the phonon signal in this novel component is not significantly different from the acceptable attenuation effects in the corresponding cylindrical components. Apparently, the important thing in minimizing these effects is the angularity of the end faces. So long as the ends of these elements are "square-cut," microwave signals of X-band frequency and higher can be effectively and efficiently transduced with the production of ultrasonic vibrations or phonons of the same frequency. A phonon-reflecting end face should for the same reason be "square-cut" but the importance of this ingular relationship is diminished where, as in FIGURE 1, reflection is not desired and the phonon signals are transduced after passage once through the full length of the piezoelectric body. In that case, the orientation of the microwave cavity with respect to the indium coated end face will determine the efficiency of the transducing action and the strength of the regenerated microwave signal.

The Doppler radar transmitter illustrated in FIGURE 5 is arranged to deliver a component of each of its signals to microwave cavity 43 through waveguide 44 for storage in the form of ultrasonic vibrations in piezoelectric, rod-like body 45. Thus, this transmitter bears the same relationship to the delay-line components of this invention just enumerated that transmitter 10 of FIGURE 1 bears to the corresponding elements of that system. Accordingly, it will be understood that a Doppler radar signal reflected back from the target to the transmitter and received there can be compared with the counterpart of that signal readout of rod 45. By this means, the accuracy and the utiilty of heretofore conventional Doppler radar systems can be substantially increased.

In the system of FIGURE 6, transmitter 50 of X-band frequency microwaves is employed in a radar system which includes a receiver 51 and a maser amplifier 52 in operative relation to receiver 51. For the purpose of protecting amplifier 52 against high-amplitude signals from transmitter 50, a delay-line assembly of this invention is incorporated in the system as illustrated in FIGURE 7. Here again, a microwave cavity 55 is provided with a microwave guide 56 to bring signals of predetermined desired frequency from a suitable source of microwave energy (not shown) and a piezoelectric rod 58 is disposed with one end portion in cavity 55 for the production of ultrasonic vibrations of phonons, as described above. The other end portion of rod 58 is disposed in the cavity of maser amplifier 52 and with its end face in firm engagement with maser ruby element 59 so that the maser may be pumped with a signal of suitable strength and desired frequency to maintain it in operating condition throughout periods when high-energy signals are being received by the maser.

In a specific example of the use or operation of the FIGURE 7 system, the maser is pumped continuously through waveguide 60 with a signal of 25-kilomegacycles. At the same time, the maser is pumped with a microwave signal of 15-kilomegacycles through the sub-combination of this invention comprising waveguide 56, microwave cavity 55 and piezoelectric rod 58. A signal of 10-kilomegacycles representing a reflected radar signal requiring maser amplification is delivered into the maser cavity via waveguide 61. Through the action of this unique combination of elements and functions, the reflected signal is amplified by the action of the maser and then delivered to receiver 51 through waveguide 62. There, thus, is no impairment of the maser operation due to high-amplitude microwave signals reaching the maser before or during the period when reflected signals requiring amplification are being received by the maser.

It is contemplated that the devices of this invention will operate as indicated above at extremely low temperatures. I have found that at room temperature attenuation tendencies are much too strong to permit coherent signal transmission in X-band or higher frequency phonon range even in very small or short piezoelectric rod-like bodies. I have, accordingly, concluded that there is an inherent or material limitation barring practical utility of components of the present invention and particularly piezoelectric portions thereof at temperatures above about 80° K. Thus, although not illustrated in all the accompanying drawings, those skilled in the art will understand that the phonon propagating and transducing components, such as bodies 20, 31, 35, 39, 45, and 58, are subjected to extreme temperatures in use—preferably in the range of liquid hydrogen temperatures or even liquid helium temperatures. Any suitable cryostat device may be employed for this purpose and, in the experiments which I have conducted, this device has taken the form of an enclosure for the microwave cavities and piezoelectric rod-like bodies. Thus, in FIGURE 1, the lower portions of waveguides 17 and 18 and the entire sub-assembly comprising microwave cavities 14 and 15 and the crystalline quartz rod 20 is housed in a liquid-tight enclosure or shell 19 submerged in and refrigerated by boiling liquid hydrogen so that throughout the operation period the temperature of the assembly within the enclosure does not exceed 25° K.

Those skilled in the art will gain a further and better understanding of the present invention from the following illustrative, but not limiting, example of the novel method and apparatus actually constructed and used:

*Example*

In using this invention and establishing that the new advantages and results set forth above can be obtained, I employed the cryogenic equipment illustrated in FIGURE 8. As illustrated in that drawing, the equipment comprises an outer dewar flask 70 containing a body of liquid nitrogen 71, an inner dewar flask 73 containing a body of liquid helium 74 and means (not shown) for supporting flasks 70 and 73 in the positions illustrated. In addition, this equipment includes tunable microwave cavities 75 and 76 provided respectively with waveguides 77 and 78 extending upwardly from the microwave cavities disposed near the lower end of flask 73 to a point well above the top of the flask assembly. A magnetron transmitter (not shown) is operatively related to waveguide 77 at its upper end while waveguide 78 is equipped with a superheterodyne receiver (also not shown). A quartz crystalline rod 80 completes the assembly and is disposed with its ends in microwave cavities 75 and 76, this rod being permitted to rest against the walls of the microwave cavities or otherwise suitably supported.

With the nitrogen and helium boiling off continuously and rod 80 consequently being maintained at 4.2° K., and with the rod tuned to the microwave cavities, a pulse one microsecond in width of 10-kilomegacycles microwave energy was delivered from a 20-watt magnetron transmitter into waveguide 77 and microwave cavity 75. By means of the superheterodyne receiver, the resulting signal produced in microwave cavity 76 was detected, demodulated, and displayed on an oscilloscope. A total of 400 separate signals were thus obtained from one input pulse as a result of the sustained echoing action of the phonons produced in the quartz rod.

Microwave cavities 75 and 76 employed in this experiment each had a Q of approximately 2,000

$$\left(Q \equiv \frac{\text{energy stored}}{\text{energy loss due to resistance}}\right)$$

Thus, the conversion factor was relatively small (about 0.1%), but was clearly sufficient for the present purposes.

Quartz rod 80 was 3 centimeters long and 0.3 centimeters in diameter and of uniform cylindrical shape. The ends of the rod were substantially planer and disposed in planes parallel to each other to within an angle of about 0.001°. Further, the plane of each end face of the rod was within 0.01° of 90° to the axis of the rod. The end surfaces were optically precise, that is, they had no irregularities or prominences greater than 5,000 Angstroms in elevation. The side of the rod was similarly optically precise and smooth to less than 5,000 Angstroms variation. The object in establishing these conditions and characteristics in the rod of X-cut quartz crystal was to minimize attenuation tendencies in the phonon signals produced in the rod in accordance with this invention. The necessity for parallelism in the relationship of planer end faces is attributable to the unusually strong tendency towards attenuation loss of phonon signals in the X-band frequency range and higher. The relationship in this regard is expressed in the formula $$\alpha \simeq \frac{\lambda \text{ sound}}{2nD}$$

where $\lambda$ is the wave length of the phonon or sound wave in the quartz rod, $n$ is the number of echoes to be obtained, D is the diameter of the rod and $\alpha$ is the angle which the planer end faces of the rod define with each other.

It may be noted that the fact that the microwave cavities and the quartz rod were all submerged in liquid helium throughout the period of the experiment in no way impaired the operation of the apparatus or obtaining of the desired results. Likewise it may be noted that tuning of the microwave cavities and the rod by positioning the rod longitudinally relative to the cavities constituted no difficulty although the rod was not suspended from the microwave cavities or supported independently of them, but rested against side walls thereof.

Having thus described this invention in such full, clear, concise and exact terms as to enable any person skilled in the art to which it pertains to make and use the same, and having set forth the best mode contemplated of carrying out this inveniton, I state that the subject matter which I regard as being my invention is particularly pointed out and distinctly claimed in what is claimed, it being understood that equivalents or modifications of, or substitutions for, parts of the specifically described embodiments of the invention may be made without departing from the scope of the invention as set forth in what is claimed.

What I claim as new and desire to secure by Letters Patent of the United States is:

1. In a Doppler radar system including a Doppler radar X-band frequency microwave transmitter and a microwave receiver to receive reflected X-band microwave signals, the combination of a rod of piezoelectric material, and means comprising a microwave cavity for directing components of microwave signals from the transmitter against one end face of the piezoelectric rod and operatively related to the rod and the receiver for transmitting microwave signals produced by the rod to the receiver for comparison with reflected microwave signals.

2. Apparatus of the class described comprising a microwave signal source capable of producing signals of at least X-band frequency, a first transformer means including a first tunable microwave cavity to receive microwave signals from said source and focus them, a second transformer means including a second tunable microwave cavity to receive and redirect microwave signals, and a rod of electrostrictive material having square-cut end portions disposed in the first and second microwave cavities for receipt of microwave signals in the first said cavity and generation of microwave signals of double the initial frequency in the second cavity.

References Cited in the file of this patent
UNITED STATES PATENTS

| | | |
|---|---|---|
| 2,695,357 | Donley | Nov. 23, 1954 |
| 2,718,637 | Goodwin | Sept. 20, 1955 |
| 2,797,410 | Korman | June 25, 1957 |
| 2,895,061 | Probus | July 14, 1959 |
| 3,012,211 | Mason | Dec. 5, 1961 |